United States Patent [19]

Kozakae et al.

[11] Patent Number: 4,858,485
[45] Date of Patent: Aug. 22, 1989

[54] INSCRIBED TRANSMISSION DEVICE

[75] Inventors: Kunitoshi Kozakae; Toru Takeda, both of Ageo, Japan

[73] Assignee: Bridgestone Cycle Co., Ltd., Tokyo, Japan

[21] Appl. No.: 226,870

[22] Filed: Aug. 1, 1988

[30] Foreign Application Priority Data

Aug. 27, 1987 [JP] Japan .................. 62-211366

[51] Int. Cl.$^4$ .............................................. F16H 1/48
[52] U.S. Cl. ..................... 74/399; 74/421 R; 74/438
[58] Field of Search ............ 74/399, 410, 421 A, 74/438, 421 R, 804

[56] References Cited

U.S. PATENT DOCUMENTS

| | | | |
|---|---|---|---|
| 511,169 | 12/1893 | Snider | 74/438 |
| 1,882,033 | 10/1932 | Pirinoli | 74/438 |
| 2,132,813 | 10/1938 | Wahlmark | 74/438 |
| 2,214,164 | 9/1940 | Fawick | 74/438 |
| 2,414,134 | 1/1947 | Bartlett | 74/438 |
| 2,462,455 | 2/1949 | Bartlett | 74/438 |
| 3,933,056 | 1/1976 | Taig | 74/399 |
| 4,148,228 | 4/1979 | Freeman | 74/438 X |

FOREIGN PATENT DOCUMENTS 57-161350 10/1982 Japan .................. 74/421 R
58-47592 10/1983 Japan .

Primary Examiner—Leslie A. Braun
Assistant Examiner—Janice E. Chartoff
Attorney, Agent, or Firm—Arnold, White & Durkee

[57] ABSTRACT

An inscribed transmission device includes a substantially crescent-shaped space between an internal gear and an external gear circumscribingly in mesh with each other. The device comprises a rolling space holder having two sets of two rollers whose centers are situated on radial axes in the crescent-shaped space on both sides of a straight line connecting centers of the internal and external gears. The internal and external gears are provided with roller rolling portions on which the rollers roll. The two sets of rollers are supported by a block member or side plates. The rolling space holder smoothly moves to keep the crescent-shaped space, thereby preventing unintentional disengagement of the internal and external gears.

6 Claims, 9 Drawing Sheets

FIG_2

FIG_3

FIG_6
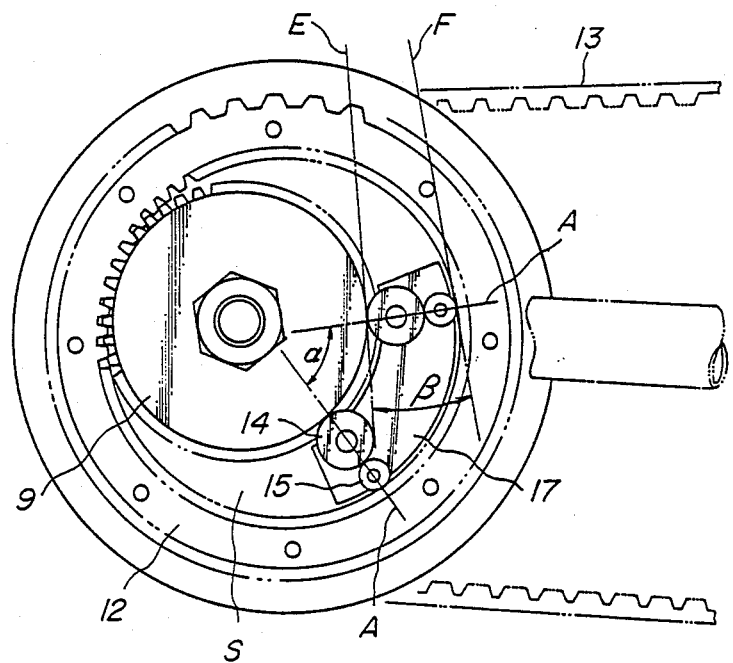

FIG_7
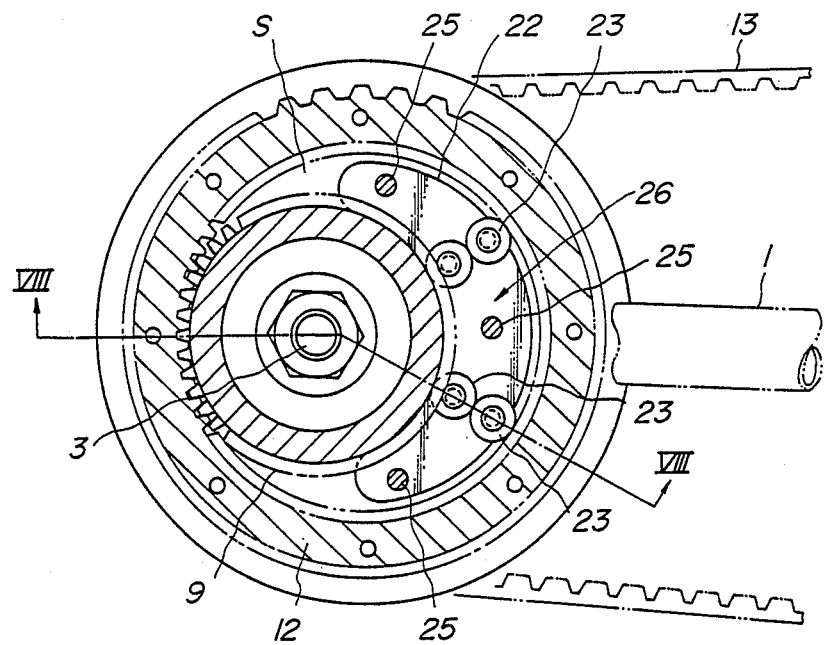

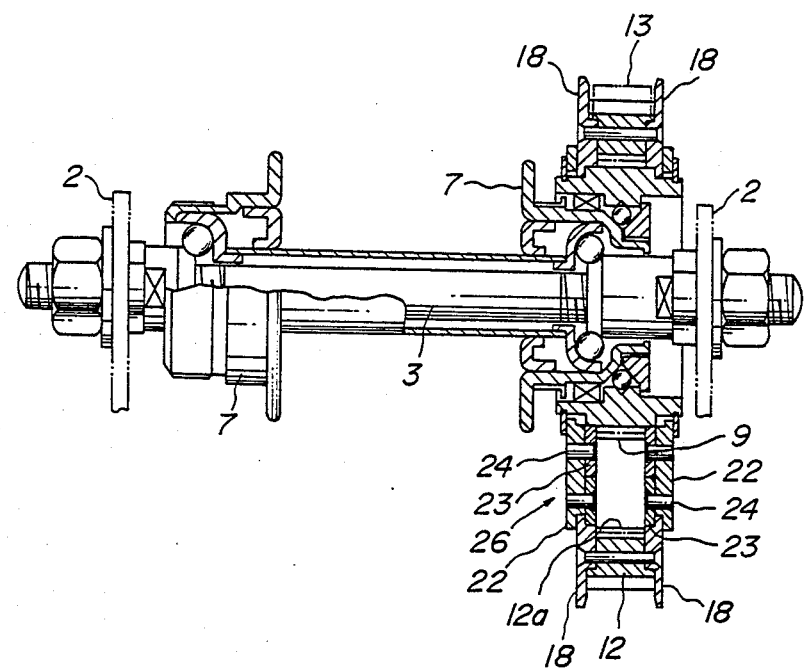
FIG_8

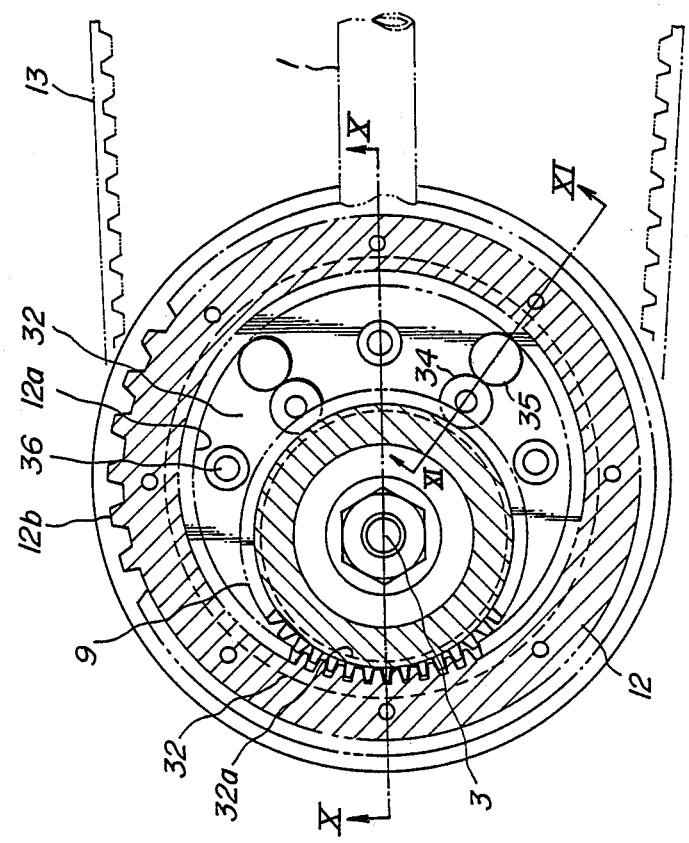

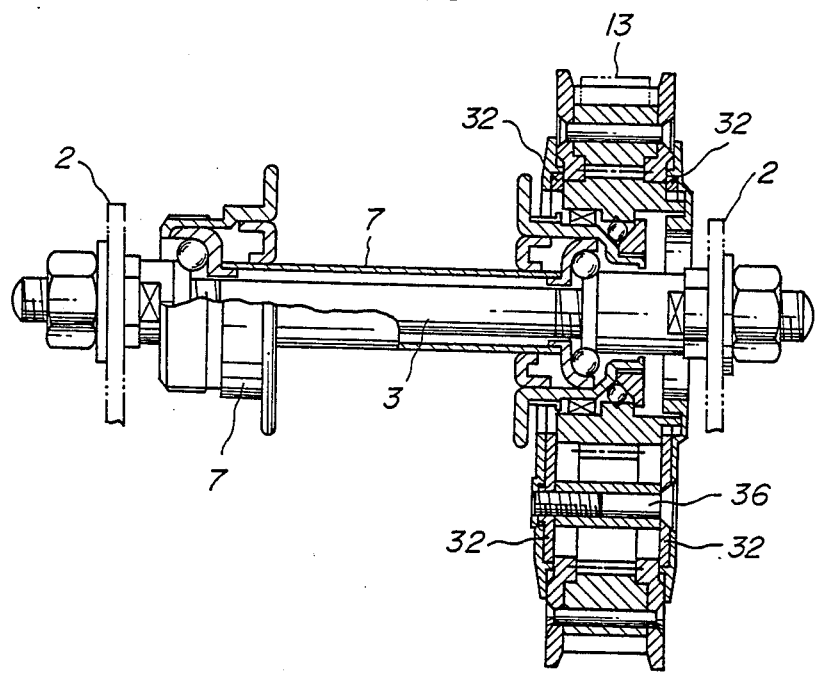
FIG._10
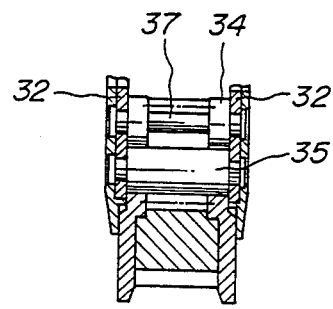
FIG._11

INSCRIBED TRANSMISSION DEVICE

BACKGROUND OF THE INVENTION

This invention relates to an inscribed transmission device including a crescent-shaped space between an external gear and an internal gear circumscribingly in mesh with each other.

Such an inscribed transmission device has been known as disclosed in Japanese Patent Application Publication No. 58-47,592 filed by the applicant or assignee of this case.

FIG. 1 illustrates one embodiment of the Japanese Patent Application Publication. As shown in FIG. 1, the device comprises a driving gear a, a driven gear b, a floating ring gear c circumscribingly engaging the driven gear b, and a toothed or cog belt d extending about the driving gear a and the floating ring gear c.

With the device shown in FIG. 1, the floating ring gear c is maintained in mesh with the driven gear b with the aid of a tension of the toothed belt d. Under certain conditions, however, unintensional disengagement of the driven and floating gears b and c would occur to cause so-called "skipping of teeth" which makes it impossible to transmit the torque from the driving gear a to the driven gear b.

SUMMARY OF THE INVENTION

It is a primary object of the invention to provide an improved inscribed transmission device which securely prevents any accidental disengagement of external and internal gears and is capable of transmitting torque smoothly without any skipping of teeth.

In order to achieve this object, the inscribed transmission device including a substantially crescent-shaped space between an internal gear and an external gear circumscribingly in mesh with each other according to the invention comprises a rolling space holder having two sets of two rollers whose centers are situated on radial axes in the crescent-shaped space on both sides of a straight line connecting centers of the internal and external gears, said rollers rolling on roller rolling portions provided on said internal and external gears.

In a preferred embodiment, the block member comprises two side plates in the form of a circular disc having an eccentric circular aperture to close the crescent-shaped space, and each of the rollers is supported between the side plates by a shaft for the roller.

According to the invention the rolling space holder including the rollers is arranged in the crescent-shaped space between the external and internal gears in mesh with each other so as to be movable relative to these gears, thereby always maintaining the crescent-shaped space to prevent the disengagement of the external and internal gears.

According to the invention, moreover, the two sets of two rollers rollingly in contact with each other are supported by the block member and adapted to roll on the roller rolling portions provided on the external and internal gears, so that the difference in movement between the rolling space holder and the other members moving relative to the rolling space holder can be absorbed by the rolling of the rollers of the rolling space holder without any sliding movement.

Therefore, the device according to the invention can securely prevent the skipping of teeth in an inscribed transmission device and operates with much less frictional loss in transmission.

In order that the invention may be more clearly understood, preferred embodiments will be described, by way of example, with reference to the accompanying drawings.

BRIEF DESCRIPTION OF THE DRAWINGS

FIGS. 5 and 6 are views for explaining the operation of the device according to the invention;

FIG. 7 is a sectional view illustrating a device of the second embodiment according to the invention;

FIG. 8 is a sectional view taken along a line VIII—VIII in FIG. 7;

FIG. 9 is a sectional view illustrating a third embodiment of the invention;

FIG. 10 is a sectional view taken along a line X—X in FIG. 9; and

FIG. 11 is a partial sectional view taken along a line XI—XI in FIG. 9.

DESCRIPTION OF THE PREFERRED EMBODIMENTS

Figure 1:
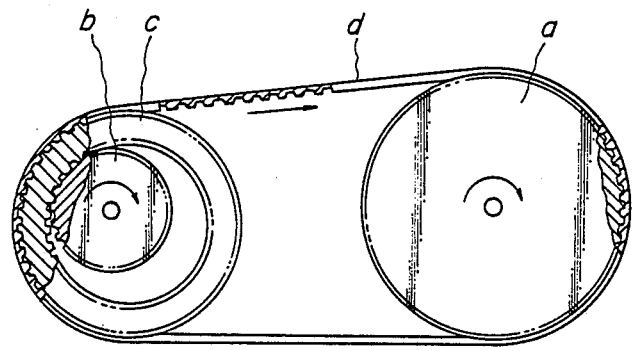
FIG. 1 is an explanatory view of the prior art.
Figure 2:
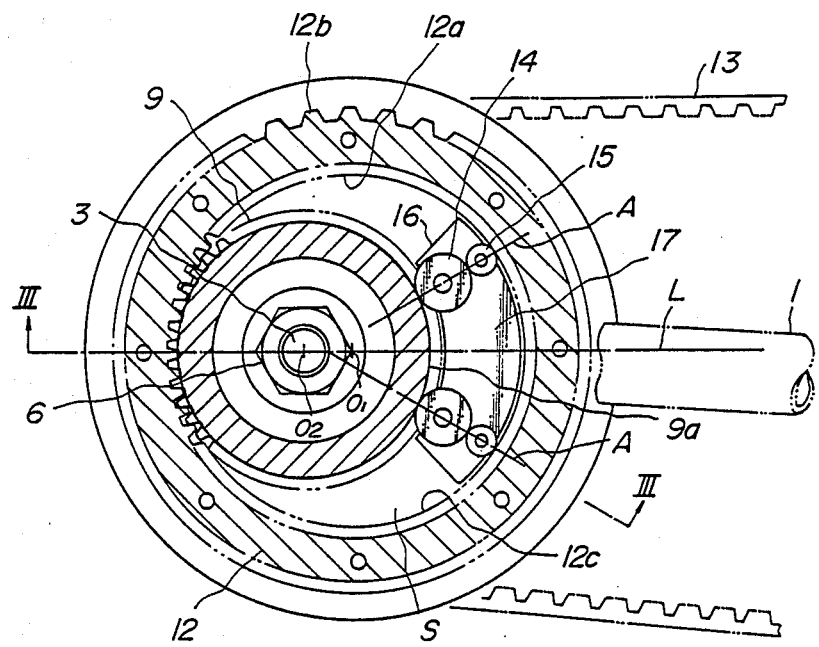
FIG. 2 is a sectional view illustrating a device according to the invention.

FIGS. 2-6 illustrate a first embodiment of the invention. The drawings illustrate chain stays 1 of a bicycle, rear fork ends 2 (FIG. 3) provided at one ends of the chain stays 1, a hub spindle 3 extending between the rear fork ends 2, a hub cone 4 threadedly engaged on the hub spindle 3 inside of the rear fork end 2, washers 5 fitted on the hub spindle 3 outwardly of the rear fork ends 2, nuts 6, a hub shell 7 rotatable through steel balls 8 relative to the hub spindle 3, an external gear 9 as a driven wheel fitted through a one-way clutch 10 and steel balls 11 on the hub shell 7 on one side, a floating gear 12 formed in its outer circumference with an external gear 12b and having an internal gear 12a in mesh with the external gear 9, and a toothed or cog belt 13 extending about the external gear 12b and a driving sprocket (not shown) for the bicycle. There is a substantially crescent-shaped space S generated between the external gear 9 and the internal gear 12a in mesh with each other.

In the embodiment shown in FIGS. 2-6, two sets of rollers 14 and 15 rollingly rotating in contact with each other are supported in a block member 16 to form a rolling unit or rolling space holder 17. The rolling space holder 17 is arranged in the crescent-shaped space S such that centers of the two sets of the rollers 14 and 15 are situated on radial axes A in the space S and on both sides of a straight line L connecting centers $O_1$ and $O_2$ of the internal and external gears 12a and 9, respectively. The rollers 14 are adapted to roll on roller rolling portions 9a provided on the external gear 9, while the rollers 15 are adapted to roll on roller rolling portions 12c provided on the internal gear 12a.

Figure 4:
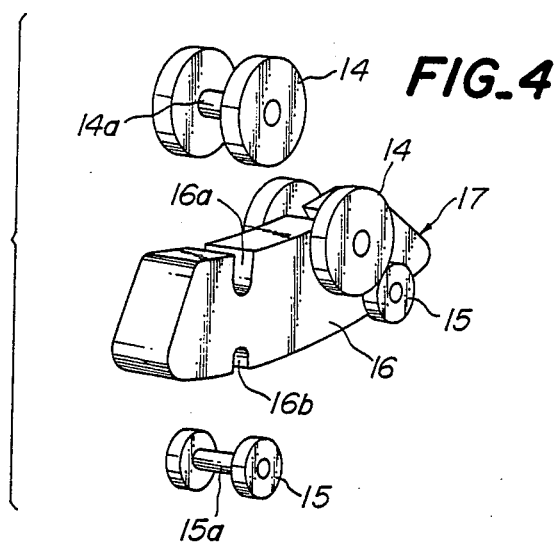
FIG. 4 is a perspective view of the rolling space holder used in the device shown in FIG. 2.

As shown in FIG. 4, the roller 14 comprises two roller elements connected by a roller shaft 14a and is supported in the block member 16 with the roller shaft 14a fitted in a groove 16a formed in the block member 16. In the same manner, the roller 15 comprises two roller elements connected by a roller shaft 15a and is supported in the block member 16 with the roller shaft 15a fitted in a groove 16b formed in the block member 16. In this embodiment, each of the rollers 14 and 15 comprises two rolling elements connected by a roller shaft which is fitted in the groove 16a formed in the block member 16.

Figure 3:
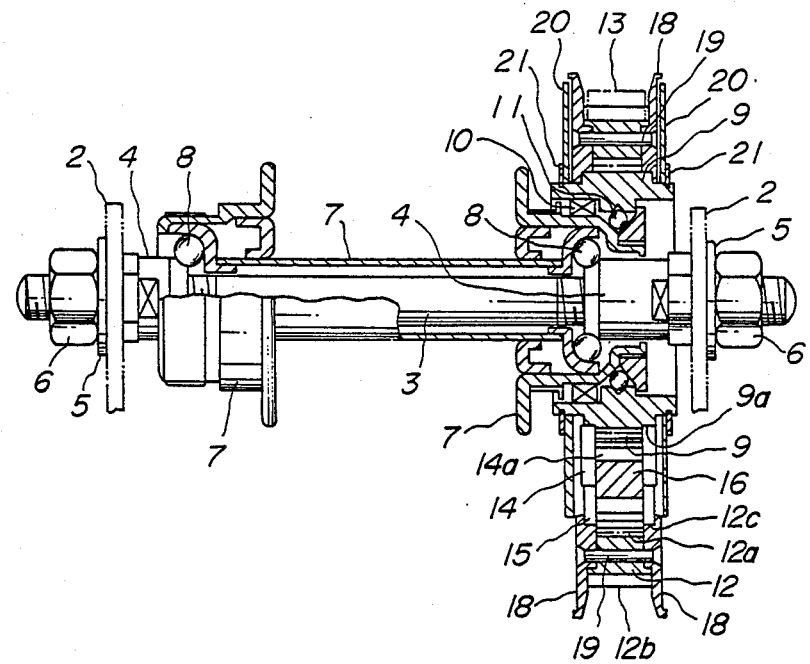
FIG. 3 is a sectional view taken along a line III—III in FIG. 2.

Referring to FIG. 3, side plates 18 are fixed to the floating ring gear 12 on its both sides by means of rivets 19 for preventing the toothed belt 13 from being dislodged. Dust sealing plates 20 for preventing dust from entering are provided outside of the side plates 18 by the snap rings 21.

FIGS. 7 and 8 illustrate another embodiment of the invention. In this embodiment, a member for supporting rollers of the rolling space holder is modified to have the functions of the side plates 18 for preventing dislodgement of the belt and the dust sealing plates 20.

As shown in FIG. 7, side plates 22 are formed substantially in the form of a crescent and arranged on both sides of the crescent-shaped space between the external gear 9 and the internal gear 12a. Two sets of two rollers 23 are arranged inside of each of the side plates 22. Therefore, there are eight rollers 23. In this embodiment, these rollers 23 have the same diameters and are supported by shafts 24 passing through the side plates 22. The side plates 22 are integrally jointed by three connecting shafts 25 to form the rolling space holder 26 together with these rollers 23. The other construction is similar to that shown in the first embodiment.

Figure 5:
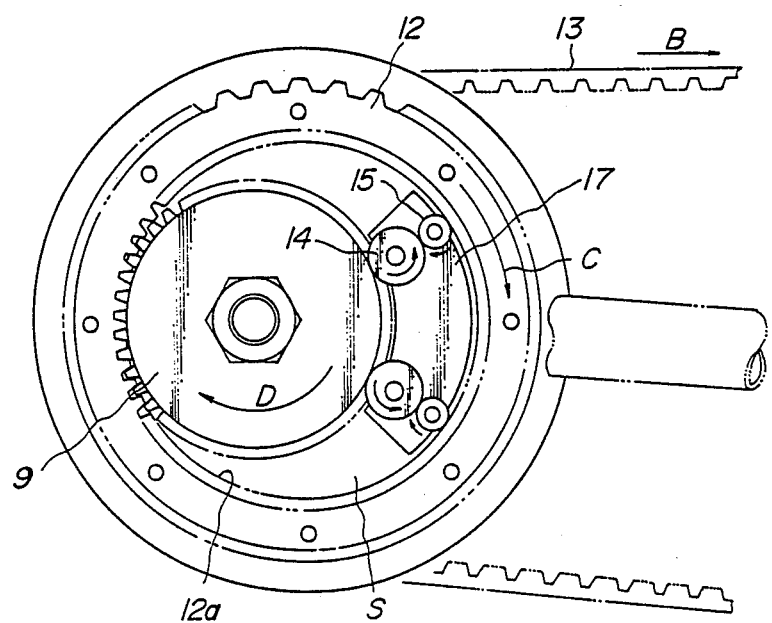

The operation of the device according to the invention will be explained hereinafter. Referring to FIG. 5, when the toothed belt 13 is moved by a crank pedal (not shown) of a bicycle in a direction shown by an arrow B in FIG. 5, the floating gear 12 is rotated in a direction shown by an arrow C, while the external gear 9 is rotated in a direction shown by an arrow D. As a result, a rear wheel (not shown) of the bicycle is rotated to drive the bicycle in a forward direction through the one-way clutch 10 and the hub shell 7.

In this case, the rollers 14 and 15 of the rolling space holder 17 rotate in directions shown by small arrows in FIG. 5, respectively, to absorb differences in movement between the respective members. In other words, smooth movements of the respective members are accomplished by the rolling of the rollers 14 and 15 to avoid any sliding movement.

If the tension in the toothed belt 13 is changed, for example, the tension in the direction B becomes larger, the floating ring gear 12 moves from the position shown in FIG. 5 to the position shown in FIG. 6.

According to the invention, the rollers 14 and 15 are so arranged that axes A passing through centers of the rollers 14 and 15 make an angle of intersection $\alpha$, and tangents E and F to the roller rolling portions 9a and 12c of the external and internal gears 9 and 12a at contact points between the rollers and roller rolling portions enclose an angle of intersection $\beta$. Therefore, the respective sets of rollers 14 and 15 always function to force the rolling space holder 17 into the maximum space portion of the space S with the aid of the contact with the roller rolling portions. In other words, when the floating ring gear 12 has moved from the position shown in FIG. 5 to the position in FIG. 6, the rolling space holder 17 moves from the position shown in FIG. 5 to the position in FIG. 6. The same holds true in moving the floating ring gear 12 in the reverse direction.

Moreover, the movement of the rolling space holder 17 relative to the external and internal gears 9 and 12a is performed by the rolling of the rollers 14 and 15. There is little slippage of the rollers. Therefore, frictional loss caused by the rolling space holder 17 is very small.

According to the invention, as the rolling space holder 17 is situated in the space S, there is no risk of skipping of teeth caused by unintensional disengagement of the external and internal gears 9 and 12a in this manner.

The operation of the embodiment shown in FIGS. 7 and 8 is similar to the above operation in the previous embodiment.

FIGS. 9–11 illustrate a third embodiment of the invention. In this embodiment, the side plates 22 in the form of the crescent in the second embodiment are modified to side plates 32 to completely cover the crescent-shaped space between the external and internal gears 9 and 12a. In other words, each of the side plates 32 is in the form of a circular disc having an eccentric aperture 32a (FIG. 9) corresponding to the eccentricity of the external gear 9 relative to the internal gear 12a. Two sets of rollers 34 and 35 are rotatably provided between the side plates 32 connected by set screws 36. Each of the rollers 34 comprises two roller elements connected by a shaft 37. Each of the rollers 35 is a roller elongated in its axial directions.

In this embodiment, the side plates 32 supporting the rollers 34 and 35 cover the crescent-shaped space for restraining the side plates 18 and completely sealing the crescent-shaped space.

As can be seen from the above description, according to the invention the rolling space holder including the rollers is arranged in the crescent-shaped space between the external and internal gears in mesh with each other so as to be movable relative to these gears, thereby always maintaining the crescent-shaped space to prevent the disengagement of the external and internal gears.

According to the invention, moreover, the two sets of rollers rollingly in contact with each other are supported by the block member and adapted to roll on the roller rolling portions provided on the external and internal gears, so that the difference in movement between the rolling space holder and the other members moving relative to the rolling space holder can be absorbed by the rolling of the rollers of the rolling space holder without any sliding movement.

Therefore, the device according to the invention can securely prevent the skipping of teeth in an inscribed transmission device and operates with much less friction loss in transmission.

It is further understood by those skilled in the art that the foregoing description is that of preferred embodiments of the disclosed devices and that various changes and modifications may be made in the invention without departing from the spirit and scope thereof.

What is claimed is:

1. An inscribed transmission device including a substantially crescent-shaped space between an internal gear and an external gear circumscribingly in mesh with each other, comprising a rolling space holder having two sets of two rollers whose centers are situated on radial axes in the crescent-shaped space on both sides of a straight line connecting centers of the internal and external gears, said rollers rolling on roller rolling portions provided on said internal and external gears.

2. A device as set forth in claim 1, wherein said rolling space holder comprises the two sets of rollers and a block member for supporting the two sets of rollers.

3. A device as set forth in claim 2, wherein each of the rollers comprises two rolling elements connected by a roller shaft which is fitted in a groove formed in said block member.

4. A device as set forth in claim 2, wherein said block member comprises two side plates substantially in the form of a crescent, and each of the rollers is supported on an inside of said side plate by a shaft for the roller.

5. A device as set forth in claim 2, wherein said block member comprises two side plates in the form of a circular disc having an eccentric circular aperture to close said crescent-shaped space, and each of the rollers is supported between said side plates by a shaft for the roller.

6. A device as set forth in claim 5, wherein each of said rollers rolling on the roller rolling portion of the external gear comprises two rolling elements connected by a shaft, and each of rollers rolling on the roller rolling portion of the internal gear comprises a roller elongated in its axial direction supported with its ends by the side plates.

* * * * *